US009817726B2

(12) United States Patent
Lee et al.

(10) Patent No.: US 9,817,726 B2
(45) Date of Patent: Nov. 14, 2017

(54) DELTA REPLICATION OF INDEX FRAGMENTS TO ENHANCE DISASTER RECOVERY

(71) Applicant: Ariba, Inc., Sunnyvale, CA (US)

(72) Inventors: Dennis Lee, San Jose, CA (US); Harshad Chavan, Cupertino, CA (US); Kiran Gangadharappa, Mountain View, CA (US); Dinesh Shahane, Cupertino, CA (US)

(73) Assignee: Ariba, Inc., Sunnyvale, CA (US)

( * ) Notice: Subject to any disclaimer, the term of this patent is extended or adjusted under 35 U.S.C. 154(b) by 128 days.

(21) Appl. No.: 14/924,101

(22) Filed: Oct. 27, 2015

(65) Prior Publication Data

US 2016/0203061 A1 Jul. 14, 2016

Related U.S. Application Data

(60) Provisional application No. 62/101,581, filed on Jan. 9, 2015.

(51) Int. Cl.

| | |
|---|---|
| ***G06F 11/00*** | (2006.01) |
| ***G06F 11/14*** | (2006.01) |
| ***G06F 17/30*** | (2006.01) |
| ***G06F 11/20*** | (2006.01) |

(52) U.S. Cl.

CPC ...... *G06F 11/1469* (2013.01); *G06F 11/1451* (2013.01); *G06F 11/202* (2013.01); *G06F 11/203* (2013.01); *G06F 17/30215* (2013.01); *G06F 2201/80* (2013.01); *G06F 2201/84* (2013.01)

(58) Field of Classification Search

CPC ............. G06F 11/1469; G06F 11/1451; G06F 17/30215; G06F 11/202; G06F 11/2023; G06F 11/203

See application file for complete search history.

(56) References Cited

U.S. PATENT DOCUMENTS

| | | | | |
|---|---|---|---|---|
| 6,405,294 B1 * | 6/2002 | Hayter | G06F 3/0601 | 711/162 |
| 6,490,610 B1 * | 12/2002 | Rizvi | G06F 11/2028 | 707/999.01 |
| 2005/0138461 A1 * | 6/2005 | Allen | G06F 11/2097 | 714/6.3 |

(Continued)

*Primary Examiner* — Philip Guyton

(74) *Attorney, Agent, or Firm* — Schwegman Lundberg & Woessner, P.A.

(57) ABSTRACT

In an example embodiment, a disaster is detected at a primary data center and, in response to the detection, a system switches over from the primary data center to a secondary data center such that searches from one or more client applications are routed to the secondary data center. Then, for each document stored in a search core of the secondary data center: a count is requested for the document from a first client application, it is determined whether the count for the document from the first client application matches a count for the document from the search core of the secondary data center, and, in response to a determination that the count for the document from the first client application does not match a count for the document from the search core of the secondary data center, a full publish for the document is requested from the first client application.

17 Claims, 12 Drawing Sheets

(56) References Cited

U.S. PATENT DOCUMENTS

| | | | | |
|---|---|---|---|---|
| 2014/0074810 | A1* | 3/2014 | Wang | G06F 17/30864 707/696 |
| 2014/0330785 | A1* | 11/2014 | Isherwood | G06F 11/1446 707/640 |
| 2015/0324259 | A1* | 11/2015 | Bastawala | H04L 67/2814 714/4.11 |

* cited by examiner

DELTA REPLICATION OF INDEX FRAGMENTS TO ENHANCE DISASTER RECOVERY

CROSS-REFERENCE TO RELATED APPLICATION

This application is a Non-Provisional of and claims the benefit of priority under 35 U.S.C. §119(e) from U.S. Provisional Application Ser. No. 62/101,581, entitled "DELTA REPLICATION OF INDEX FRAGMENTS TO ENABLE QUICK DISASTER RECOVERY," filed on Jan. 9, 2015 which is hereby incorporated by reference herein in its entirety.

TECHNICAL FIELD

This document generally relates to methods and systems for use with computer networks. More particularly, this document relates to the delta replication of index fragments to enhance disaster recovery in a cloud.

BACKGROUND

The indexing and searching of structured data are important functionalities for many businesses on both sides of sales transactions. For example, sellers may provide access to catalog data (including, for example, product information on various products for sale) to buyers to allow buyers to select items to purchase or contract for. This type of usage is especially prevalent for businesses, which often procure items in large quantities directly from a supplier. Traditionally such structured data was stored in dedicated databases. An authorized buyer, for example, would gain viewing access to a supplier's database and thus be able to search directly the products in the database.

Recently there has been increased movement of data to the cloud. In such cloud environments, there is a lot more data (in both quantity and size) to be stored. This can complicate the process of indexing the data in order for it to be efficiently stored and searched.

BRIEF DESCRIPTION OF DRAWINGS

The present disclosure is illustrated by way of example and not limitation in the following figures.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, disaster recovery in a cloud is provided through the use of a unique sharding technique. Specifically, in an example embodiment, re-sharding with indexing is provided on a pre-defined schedule. This provides delta replication of index fragments to enhance disaster recovery (e.g., to enable quick disaster recovery).

Figure 1:
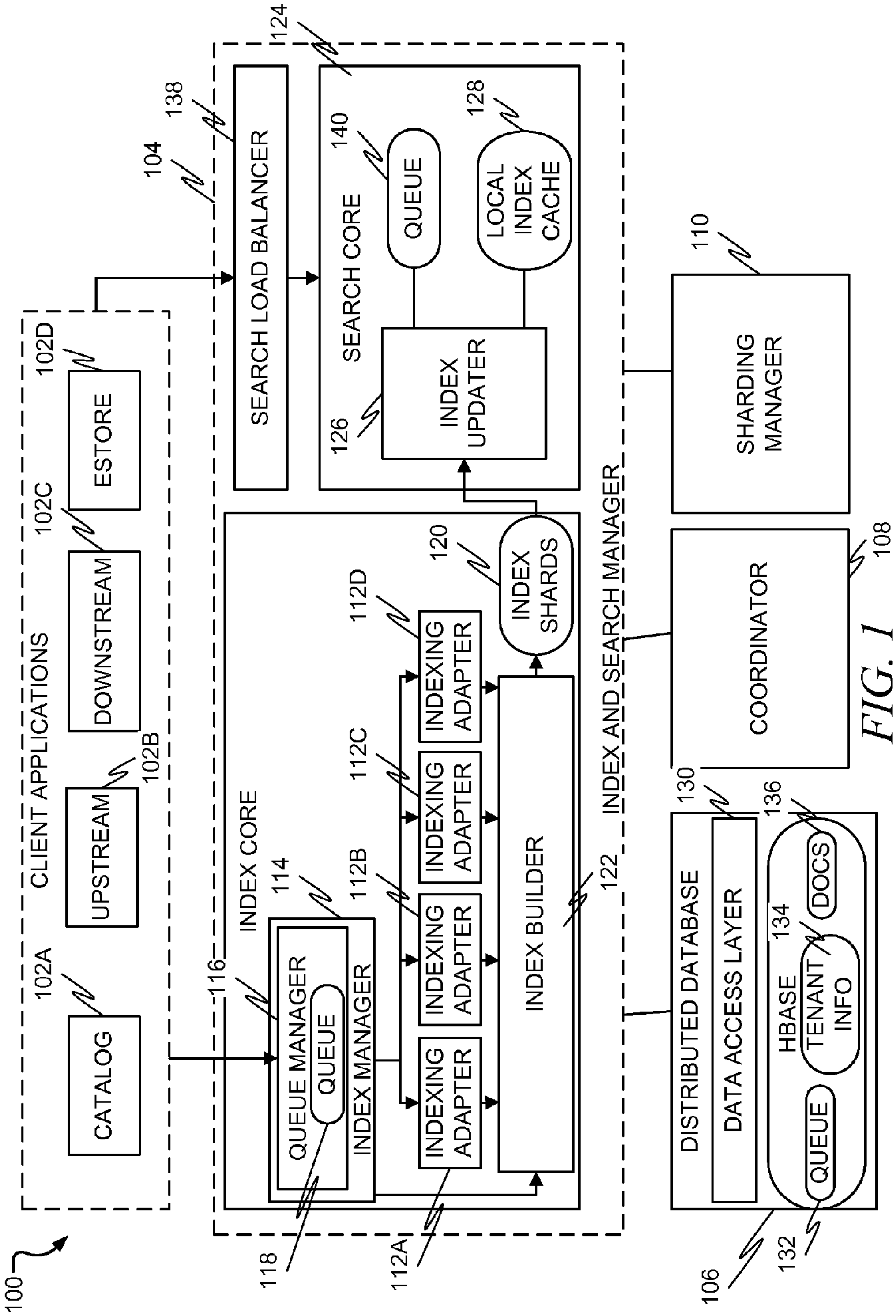
FIG. 1 is a block diagram illustrating a system, in accordance with an example embodiment, for indexing and searching structured data.

FIG. 1 is a block diagram illustrating a system 100, in accordance with an example embodiment, for indexing and searching structured data. The system 100 includes one or more client applications 102A, 102B, 102C, 102D, an index and search manager 104, a distributed database 106, a coordinator 108, and a sharding manager 110. Each client application 102A, 102B, 102C, 102D may represent a different application providing data to be indexed and eventually searched by the system 100. A single tenant (e.g., customer such as a company) may provide multiple clients, while other tenants may provide just a single client. In the depicted figure, client application 102A is or includes a catalog application, client application 102B is or includes an upstream application, client application 102C is or includes a downstream application, and client application 102D is or includes an eStore application.

Client applications 102A, 102B, 102C, 102D may provide one or more of three different types of data streams (not pictured). Each data stream may have its own different data with distinct lifecycle and purpose. These data streams may be known as primary, auxiliary, and relevance and ranking (R/R). The primary data stream may include primary data, which is the data that is the main subject of indexing and searching. The auxiliary data stream may include data that is not directly indexed or searched but may enrich the primary data. The R/R data stream may include R/R data, which is data that plays a role in relevance and ranking of primary data items during searching. As illustrative examples, if the client application 102A provides a catalog, the primary data may include Catalog Interchange Format (CIF) and Catalog Extensible Markup Language (cXML) catalogs, with the auxiliary data including supplier records, type definitions, contracts, and views, and the R/R data including a click stream and transaction data. If the client application 102B provides upstream information, the primary data may include contracts and projects, with the auxiliary data including entitlement information and the R/R data including a click stream. If the client application 102C provides downstream information, the primary data may include approvables, with the auxiliary data including master data and the R/R data including transaction data.

Data streams can be transported as single documents, a multi-part collection, or a set of documents. For each client application 102A, 102B, 102C, 102D, an indexing adapter 112A, 112B, 112C, 112D may be provided. Each indexing adapter 112A, 112B, 112C, 112D can include a parser created to parse document types supported by the corresponding client application 102A, 102B, 102C, 102D. As an example, client application 102A providing catalog data may utilize indexing adapter 112A, which may include a CIF parser (to parse primary CIF catalog data) and various XM parsers for the auxiliary data, such as kit information, Units of Measure (UOM) map, etc. Each parser may have two modes. The first mode can parse the byte stream of the incoming documents into rows. The second mode can parse the rows into an indexable object.

As pictured, the indexing adapters 112A, 112B, 112C, 112D may actually be contained in the index and search manager 104. An index manager 114 may act to manage the indexing process. This may include a queue manager 116 which manages a queue 118 containing incoming data from the client applications 102A, 102B, 102C, 102D, which needs to be indexed. The index manager 114 may act to send data at the front of the queue 118 to the appropriate indexing adapter 112A, 112B, 112C, 112D for the corresponding client while also building a request to an index builder.

In an example embodiment, the index manager 114 may have a redundant architecture that provides an application programming interface (API) to the client applications 102A, 102B, 102C, 102D to allow the client applications 102A, 102B, 102C, 102D to submit indexing jobs. The indexing message produced through the API may contain enough information to uniquely identify the request. This identification could be used to track the status of the submitted jobs.

The index manager 114 may utilize feedback from the distributed database 106 to decide on the indexing jobs to be run in the database 106 to allow a scalable computing architecture for building index shards 120. Specifically, the index manager 114 may send a request to build an index to the index builder 122, which may build the index shards 120. A search core 124 may contain an index updater 126, which can take the index shards 120 and update a local index cache 128 using the index shards 120. This local index cache 128 can then be synchronized with a network file system, which can then distribute the index to the distributed database 106. Each index shard 120 is a subset of the index for a given file type. For example, a shard could include catalog items from a subset of tenants. For large catalogs, a single catalog may span multiple index shards 120.

The distributed database may 106 may contain a data access layer 130, a queue 132, tenant information 134, and documents 136.

The search core 124 may host a Lucene index and answer search queries via search load balancer 138, which acts to balance the load of search requests among multiple instantiations of the search cores 124 on multiple physical or logical servers. The search core 124 may also expose a REST-based search and faceting API (not pictured). The search core 124 may perform aggregation, faceting, ranking, and relevance algorithms on search results. The source documents are primary indexing targets. Each source document may store a document identification key for auxiliary data. In an example embodiment, the auxiliary data itself is stored in the same index shard 120. This allows for locality of reference, so that access to an auxiliary data item related to a primary data item can be easily retrieved during a search.

The search core 124 may keep track of recent changes to the local index cache 128 in a special queue 140 receiving the updates to support search. The updates may be immediately applied to the reader but may be batched before committing to the local index segments.

The index manager 114 may use information from the coordinator 108 and the sharding manager 110 to decide on the indexing jobs to be run in the distributed database 106 to allow a scalable computing architecture for building the index shards 120.

Each index shard 120 may contain Lucene index segments for a set of tenants, as will be described in more detail below. The job of indexing may be designed as a map-reduce job that parses the source document and any auxiliary documents to create the Lucene indexing segments.

Within the local index cache 128, the primary documents may be modeled as Lucene "documents". The document fields, their indexing properties (stored, indexed, etc.), norms, etc. may be modeled in the bundle providing the local index cache 128. The auxiliary document identifications may be stored in the Lucene document for linking the auxiliary data. The actual auxiliary documents may be stored in the same index as separate documents. For example, a single shard may contain documents relating to a first tenant, including a first catalog item (with item attributes and supplied identification), a second catalog item (with item attributes and supplied identification), a third catalog item (with item attributes and supplied identification), and a supplier document with three different supplier detail files. The supplier document is a single document with the supplier detail files being auxiliary documents. The supplier document may be stored with a key matching the supplier identification field in each source document in the index.

The coordinator 108 may implement a protocol for routing, shard configuration, rolling-apply, and other management functions. The coordinator 108 may additionally provide the node status and consensus protocol.

The sharding manager 110 may implement the elasticity architecture for distributing the index across search cores 124. In an example embodiment, the sharding manager 110 may receive a HyperText Transfer Protocol (HTTP) request for a search and is aware of which search core 124 can respond to this request. It can then route the request to the specific search core 124, perhaps based at least partially on load balancing if multiple search cores 124 can respond to the request. The search core 124 may then use libraries to parse the queries and launch a search and then respond with matches found, in an extensible markup language (XML) document. The XML document may comprise primary data along with the supporting auxiliary data In an example embodiment, data from the client applications 102A, 102B, 102C, 102D is indexed to be stored in a multi-tenant, multi-modal, distributed database (e.g., distributed database 106). "Multi-tenant" means that the data from one entity is stored along with the data from another entity, which, as will be seen, makes storage more efficient. "Multi-modal" means that data from multiple client applications 102A, 102B, 102C, 102D of a single entity, including data that is parsed using a completely separate indexing adapter 112A, 112B, 112C, 112D, can be stored within that tenant's area of the distributed database 106. The distributed database 106 itself can then be distributed among multiple physical and/or logical servers.

Additionally, as will be discussed in more detail below, the distribution of the distributed database 106 can be dynamically altered so that tenants can be dynamically reassigned to different physical and/or logical servers at any time. This may be based, for example, on need, which may be based on a combination of factors, including data size, data quantity, size of the entity, and frequency of search.

As described briefly above, sharding allows for the segmentation of large amounts of data to the indexed. A segment may also be known as a tenant and represents a parameter for segmenting data. A segment can map to a platform tenant or some other type of entity. An object class is a search infrastructure used to support the searching of data items. The object class defines the data. It can indicate that the data is, for example, catalog data, requisition data, contract data, etc.

In an example embodiment, sharding is driven by four goals: availability, scalability, elasticity, and flexibility. Availability indicates that indexed data should be highly available (e.g., little chance of being unable to access the data at any point in time, even if some storage locations are inaccessible or down). Scalability indicates that the search infrastructure should be able to function well as the size grows, both in terms of index size and in terms of search volume. Elasticity indicates that there is an ability to dynamically assign capacity to tenants to make it easier to plan capacity and achieve better resource utilization. Flexibility indicates that different scalability requirements for different tenants or data classes can be supported.

As described above, the indexing itself may be performed using Lucene indexes. Lucene works by taking documents and fields. A document in Lucene is a class that represents a searchable item. The document is converted into a stream of plain-text tokens. The tokens are then analyzed to make the tokens more friendly for indexing and storage. Then the tokens are stored in an inverted index. Additional details about Lucene indexes are beyond the scope of this disclosure.

Figure 2:
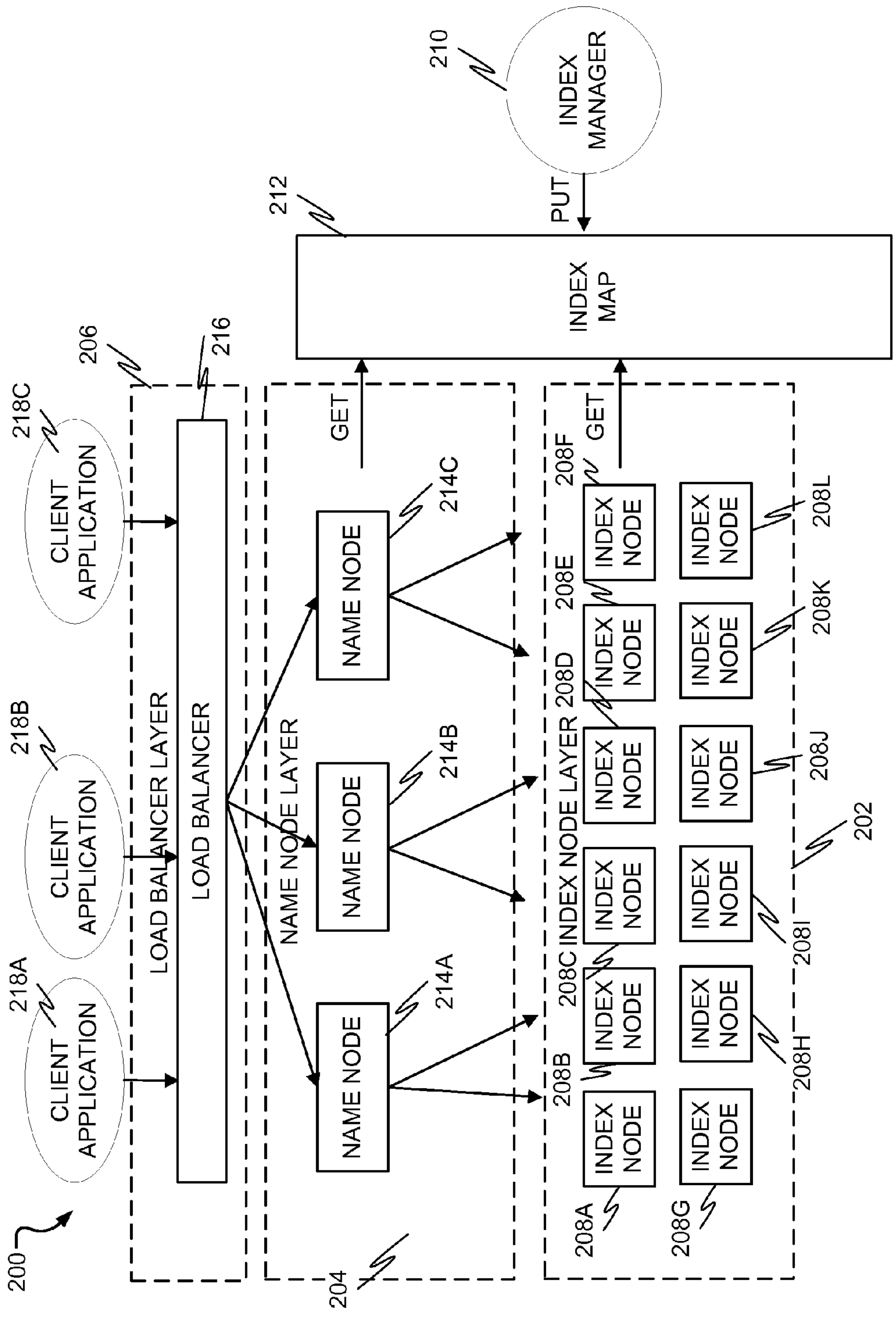
FIG. 2 is a block diagram illustrating a search infrastructure in accordance with an example embodiment.

FIG. 2 is a block diagram illustrating a search infrastructure 200 in accordance with an example embodiment. The search infrastructure 200 includes three layers: an index node layer 202, a name node layer 204, and a load balancer layer 206.

In an example embodiment, the index node layer 202 may comprise a plurality of index nodes 208A-208L, each index node 208A-208L comprising a virtual machine. In addition, each index node 208A-208L can also be referred to as a shard. Each shard holds a piece of an index (or sometimes the whole index) for a given tenant. Index nodes 208A-208L are responsible for executing searches on the index. It is possible that the entire tenant index fits in a single shard, but the design may assume that the tenant index may need to be distributed across multiple shards. The index manager 210 is responsible for mapping tenants to shards. The mapping information is stored in an index map 212. A federated query (query based on information from multiple sources) may be used if the tenant data is indexed to multiple shards. An index node 208A-208L may look at the tenant-to-shard mapping data stored in the index map 212 to determine if it needs to execute a local search or a federated search.

Elasticity may be accomplished by adding more index nodes 208A-208L as the index size grows or more tenants are added. Additionally, one failed data node should not cause searches to fail. In order to accomplish this, the index manager 210 can replicate the tenant data into two or more shards. In other words, any given index segment for a given tenant can be served by at least two index nodes 208A-208L.

The name node layer 204 may include a plurality of name nodes 214A-214C. Each name node 214A-214C may be an application responsible for mapping a client search request to an index node 208A-208L. Even though any index node 208A-208L may be capable of serving any search request, the goal of the name node 214A-214C is to select an index node 208A-208L that holds at least part of the tenant index. Thus, in the best-case scenario, the local search is executed by the index node 208A-208L that contains the data in its local index.

In an example embodiment, each name node 214A-214C may look at tenant-to-shard mapping data stored in the index map 212. The name node 214A-214C may perform a lookup on the index map 212 and then redirect the search request to the appropriate index node 208A-208L.

The load balancer layer 206 may include a load balancer 216, whose job it is to receive inbound search requests from client applications 218A-218C and invoke one or more name nodes 214A-214C to satisfy the search requests. The load balancer 216 acts to load balance these search requests among the name nodes 214A-214C.

The index manager 210 may be responsible for assigning tenants to shards. This mapping may be dynamic (e.g., the shards may be assigned to the tenants on demand at run-time). Elasticity may be accomplished by dynamically assigning available capacity to tenants on an as-needed basis.

In an example embodiment, the index manager 210 may include a tool used for capacity planning. The goal is to plan enough capacity to support the data needs for all the tenants.

In an example embodiment, the index manager 210 may be implemented by a set of nodes connected to a coordinator in an active-passive type configuration. One of the index manager nodes can be elected as the primary node by the coordinator. The backup index manager nodes can watch the "status" of the primary node and take over if needed. As will be described later, the index manager 210 can be collated with a queue manager. The primary API for the index manager 210 may be based on asynchronous queue-based messaging and therefore it makes sense to have the node play a dual role.

In an example embodiment, the index manager node subscribes to one or more tenant queues to receive indexing instructions. This may be the primary interface to the index manager 210. The index manager node may also be connected to the coordinator for watching the current shard configuration information.

Incoming messages may be classified based on the shard configuration, and new indexing tasks that can be created based on the type of messages. Table 1 below describes example structures of these messages:

TABLE 1

| Message | Schema | Description |
|---|---|---|
| <CIFType> | CIF<br>CIF File Path<br>DATA position<br>ENDOFDATA position<br>Num Items | Type definition for CIF catalog. |
| New Subscription | CIF: CIFType<br>CIF Edited File Path: CIFType<br>Tenant ID: String | Submits the new indexing task. |

TABLE 1-continued

| Message | Schema | Description |
|---|---|---|
| | Timestamp: long<br>Subscription Name: String<br>Closure Argument: String | |
| New Version | CIF: CIFType<br>CIF Edited File Path: CIFType<br>Tenant ID: String<br>Timestamp: long<br>Subscription Name: String<br>Closure Argument: String<br>Version: int | Creates a new version of the specified catalog. The incremental loaded version is relayed to active cores using a special NRTUpdate message. |
| Delete Version | Tenant ID: String<br>Timestamp: long<br>Subscription Name: String<br>Closure Argument: String<br>Version: int | Deletes a Version |
| Delete Subscription | Tenant ID: String<br>Timestamp: long<br>Subscription Name: String<br>Closure Argument: String | Delete all versions for a given subscription |

Figure 3:
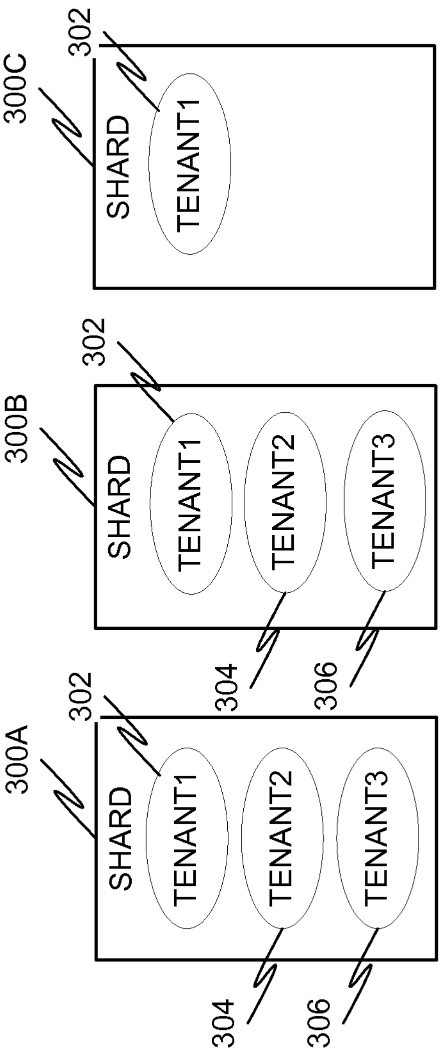
FIG. 3 is a diagram illustrating an example of elastic assignment of tenants to shards in accordance with an example embodiment.

FIG. 3 is a diagram illustrating an example of elastic assignment of tenants to shards in accordance with an example embodiment. There are three shards 300A, 300B, 300C. The first tenant 302 may be the largest and may be distributed/copied among all three shards 300A, 300B, 300C. The second tenant 304 may be smaller and fit on a single shard, but for high-availability purposes is replicated on both shards 300A and 300B. Likewise, a third tenant 306 may be smaller and fit on a single shard, but for high-availability purposes is replicated on both shards 300A and 300B. Shard 300A and shard 300B may then be fully occupied, whereas shard 300C may have room for more tenants. The assignments depicted here may be dynamically assigned. Thus, for example, if the size of the first tenant 302 shrank significantly while the size of the second tenant 304 grew significantly, the tenants 302, 304 could be redistributed so that the first tenant 302 was only present on shard 300A and shard 300B while the second tenant 304 was present on all three shards 300A, 300B, 300C.

The total capacity of the search infrastructure is proportional to the number of index nodes. The capacity of an index node may be defined in terms of two parameters: index size (the amount of data it can support) and throughput (the number of search results it can handle per second).

The capacity requirement for a tenant may be specified via three variables: index size increment (capacity the tenant will need in a given time window, e.g., number of active catalog items or number of transactions per year), throughput (e.g., number of expected searches per second), and a replication factor (number of times the data has to be replicated to support High Availability (HA) needs, which in the above example is two).

The index map 212 may be the data structure used by the index manager 210 to store tenant-to-shard mappings. The data itself may be stored in the distributed database 106. In an example embodiment, the data structure is defined as described in Table 2.

TABLE 2

| Element name | Description | Usage |
|---|---|---|
| segment__name | It can be tenant name, ANID or any other data segmentation field value. | |
| object__class | Index manager will index catalog, requisitions, cXML docs, etc. | |
| current__shard | List of shards containing the current data, e.g., shard-1a: shard-3b: shard45c. This means the current data for a given segment is replicated in shard-1a, shard-3b and shard-3c. | Index manager uses it for publishing tenant data. Index manager should update it when a tenant is assigned a new shard. |
| recent__shards | List of shards that contain the most recent data. Use some syntax to identify replication (e.g., shard-1a: shard-1b, shard24d: shard34c). | Used by data nodes to determine the data nodes to execute the federated query. Index manager should update it when a tenant is assigned a new shard. |
| all__shards | List of all shards in chronological order. | Data nodes use this to execute federated search for older data. |

In an example embodiment, each shard holds an index for multiple tenants. For each tenant, the index may include both primary data and auxiliary data. The primary data index can contain auxiliary reference keys.

Figure 4:
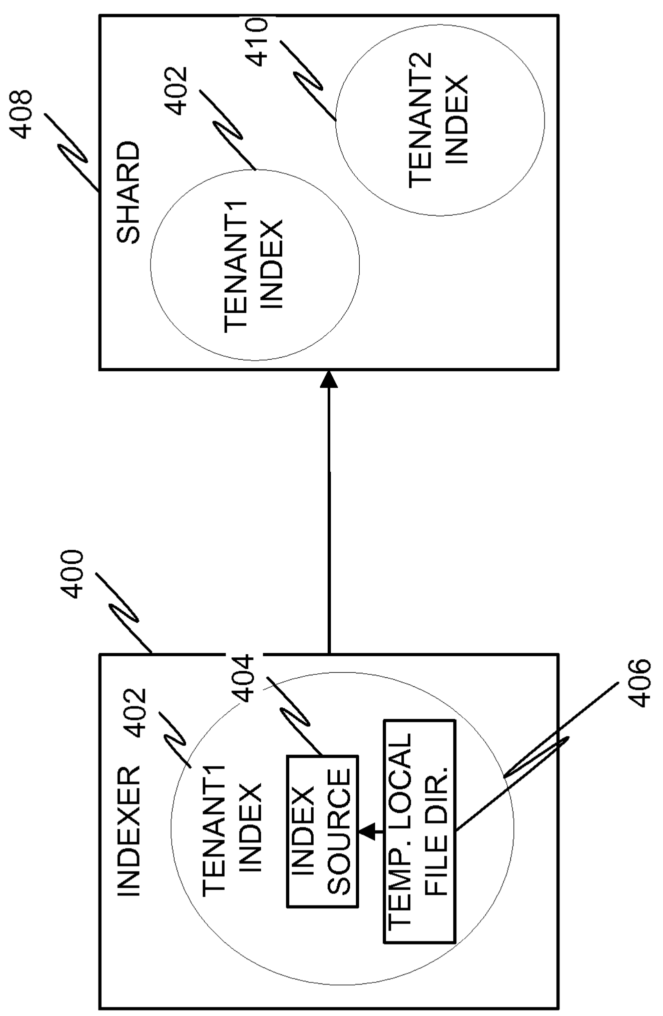
FIG. 4 is a diagram illustrating an indexer and shard in accordance with an example embodiment.

FIG. 4 is a diagram illustrating an indexer 400 and shard 408 in accordance with an example embodiment. Here, the indexer 400 may store a first tenant index 402. The first tenant index 402 may hold the index source 404 in the distributed database (e.g., the distributed database 106 of FIG. 1). When the indexer 400 receives a publish request, it can copy the index to a temporary local file directory 406, update the first tenant index 402 with data from the request, then copy the first tenant index 402 back to the distributed database. After the whole first tenant index 402 is ready, it can be written to the corresponding shard 408, where it can be stored with a second tenant index 410.

In an example embodiment, each shard represents a final manifestation of a Lucene index ready for searching.

In an example embodiment, full indexing of data can be performed as needed. This is in contrast to previous solutions which could not change the shape of the index.

In an example embodiment, the search component and the indexing component are kept separate, which allows them to run independently and potentially simultaneously. For example, while one tenant is uploading additional data for a catalog to be indexed to the indexing component, another tenant could be searching an existing version of the catalog.

Figure 5:
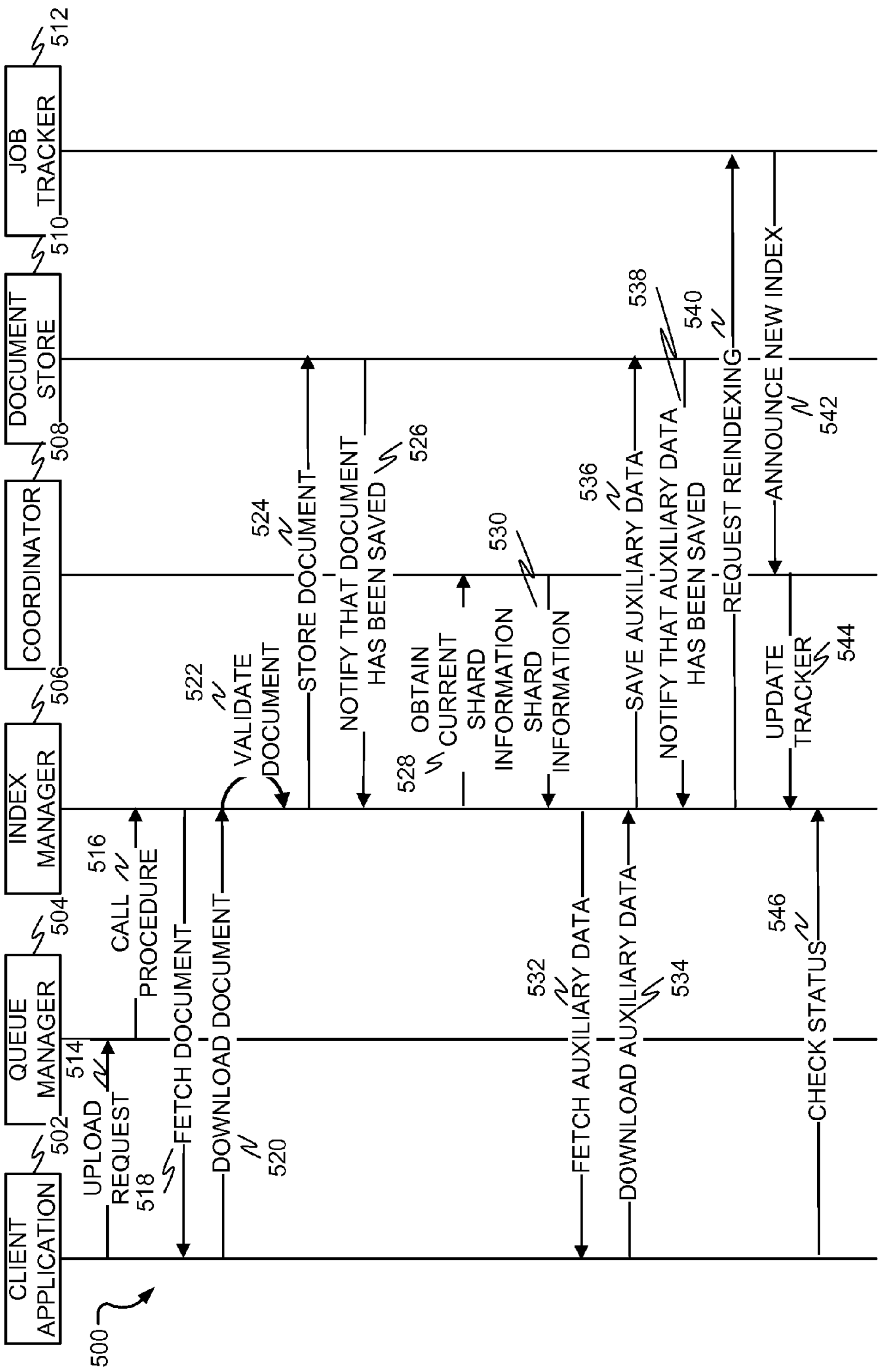
FIG. 5 is a sequence diagram illustrating a method, in accordance with an example embodiment, for publishing data using the publish protocol.

FIG. 5 is a sequence diagram illustrating a method 500, in accordance with an example embodiment, for publishing data using the publish protocol. The method 500 may utilize a client application 502, a queue manager 504, an index manager 506, a coordinator 508, a document store 510, and a job tracker 512. At operation 514, the client application 502 may send a new upload request to a queue. The location of this queue may be known to the client application 502. The queue may be hosted by the queue manager 504. In an example embodiment, the queue manager 504 may be collocated with the index manager 506. In an example embodiment, the upload request may be formatted as follows:

Message Type: NewFullLoad
Tenant: <Tenant name>
Subscription: <subscription-name>
Version: <version number>
Source Document Location: <url to download CIF file>
Auxiliary Data Location: <url to download auxiliary data>
Closure Argument: <receipt id generated by the application>

The following is an example upload request, written in Extensible Markup Language (XML):

Example xml Message:

```xml
<?xml version="1.0" encoding="UTF-8" standalone="yes"?>
<request>
  <auxDataURL>http://auxDataURL?param=123</auxDataURL>
  <indexAdapterId>catindexer</indexAdapterId>
  <initParams>
    <entry>
      <key>b</key>
      <value>2</value>
    </entry>
    <entry>
      <key>c</key>
      <value>3</value>
    </entry>
  </initParams>
  <locale>it</locale>
<primaryDocumentURL>file://primary%20data</primaryDocument
URL>
  <publishType>Full</publishType>
  <instructions>0</instructions>
  <relatedJobId></relatedJobId>
  <schemaURL></schemaURL>
  <tenantId>p2pTeSg</tenantId>
</request>
```

At operation 516, a procedure is called on the index manager 506 by the queue manager 504. This procedure may, at operation 518, use the information in the upload request to fetch the document to be uploaded (e.g., CIF file if the client application 502 is a catalog application). At operation 520, the index manager 506 asynchronously downloads the document. At operation 522, the index manager 506 validates the document (without parsing). In an example embodiment, the message can be further enhanced to obtain additional information potentially useful for preparing the input split for the indexing Map-Reduce job. The document (with or without the enhanced additional information) can then be stored in the document store 510 at operation 524. The document store 510 may be stored in a distributed database, such as a Hadoop database. At operation 526, the index manager 506 may receive a notification that the document has been saved.

At operation 528, the index manager 506 may query the coordinator 508 to obtain current shard information based on the upload request. This information is used to determine if resharding is necessary or not. At operation 530, the current shard information is sent to the index manager 506 by the coordinator 508.

At operation 532, the index manager 506 then downloads auxiliary data from the client application 502 to enrich the index request even further. At operation 534, the auxiliary data is sent to the index manager 506. At operation 536, the auxiliary data is stored in the document store 510. At operation 538, confirmation of the save is received by the index manager 506.

At operation 540, a request to reindex shards is sent to the job tracker 512. At operation 542, a new index is announced to the coordinator 508. At operation 544, a message is sent from the coordinator 508 to the index manager 506 to update the tracker. Later, the client application 502 may send a check status request to the index manager 506 at operation 546.

In an example embodiment, the distributed database is a Hadoop cluster. The Hadoop cluster is provided to provide a scalable way to build an index, including a full rebuild via Map-Reduce style programming. It also provides a stable storage with replication. In an example embodiment, the Hadoop cluster can be configured with the following configuration:

| | | |
|---|---|---|
| Name Node | 1 | HDFS directory |
| Data Nodes | 4 | HDFS Data Storage |
| Job Tracker | 2 | Job Controller |
| Task Tracker | 4 | Running Map-Reduce Tasks |
| Secondary Name Node | 1 | Backup for HDFS directory |

Figure 6:
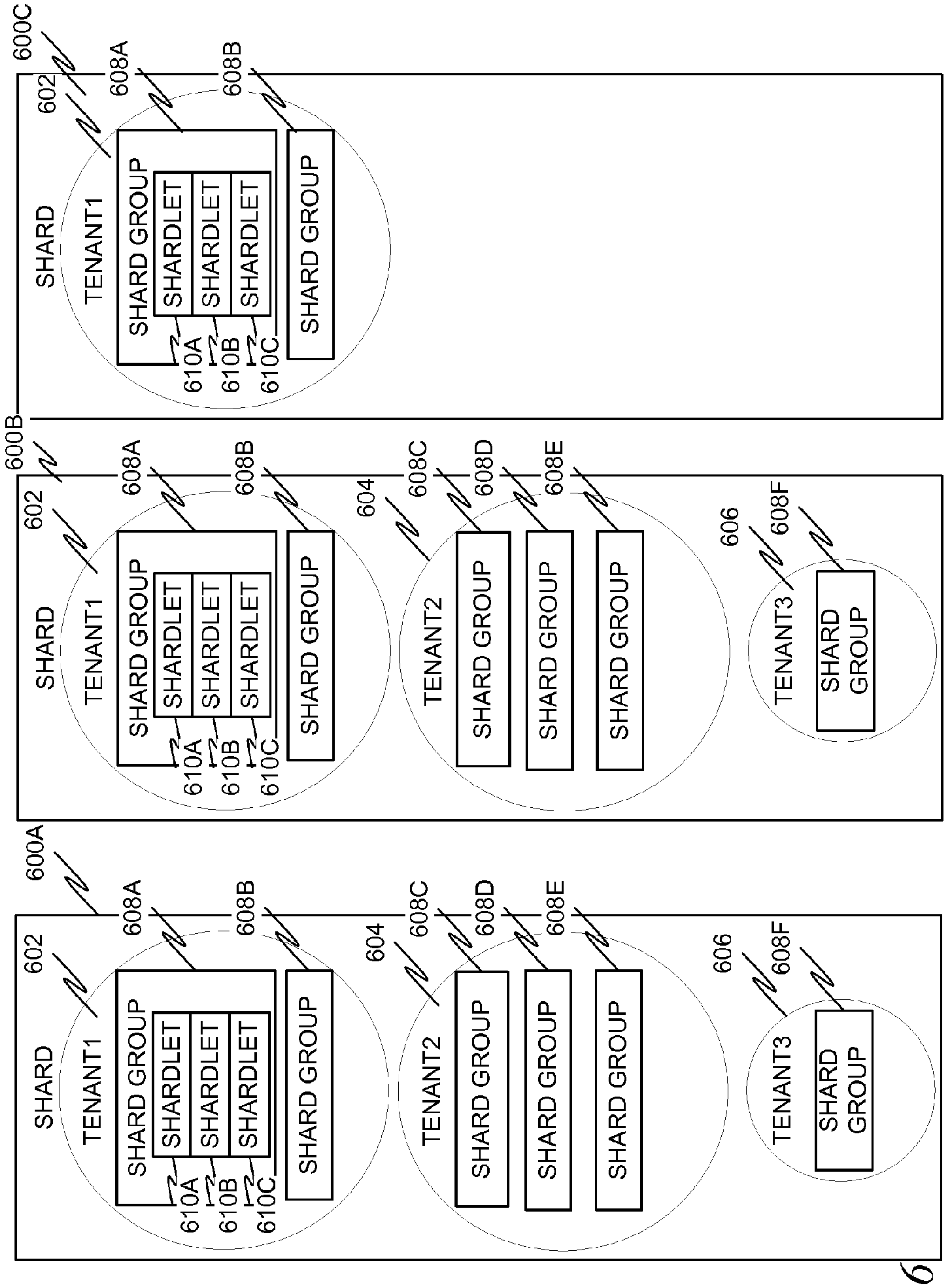
FIG. 6 is a block diagram illustrating the organization of Shardlets in accordance with an example embodiment.

FIG. 6 is a block diagram illustrating the organization of Shardlets in accordance with an example embodiment. As with FIG. 3, there are three shards 600A, 600B, 600C (corresponding to shards 300A, 300B, and 300C of FIG. 3). The first tenant 602 may be the largest tenant and may be distributed/copied among all three shards 600A, 600B, 600C. The second tenant 604 may be smaller and fit on a single shard, but for high-availability purposes is replicated on both shards 600A and 600B. Likewise, third tenant 606 may be smaller and fit on a single shard, but for high-availability purposes is replicated on both shards 600A and 600B. Shard 600A and shard 600B may then be fully occupied, whereas shard 600C may have room for more tenants. Within each shard 600A, 600B, 600C there are various combinations of ShardGroups 608A-608F. Each ShardGroup 608A-608F may be comprised of various combinations of Shardlets 610A-610C. Here, for simplicity, only Shardlets 610A-610C for ShardGroup 608A are shown, although one of ordinary skill in the art will recognize that each of the ShardGroups 608A-608F contains Shardlets.

As described above, each Shardlet 610A-610C may be computed as a Lucene index. This may involve looking at other related objects to the object being indexed. For example, if the object is a catalog item, the other related objects may include supplier information for the supplier of the catalog item and classification information for the catalog item. This related information may be the auxiliary data described earlier. Notably, since the Lucene index is based at least partially on the auxiliary data, the changing of a piece of auxiliary data can cause the Lucene index for the primary data to change, which may then change the Shardlet for the primary data, which may then change the ShardGroup for the primary data, which then may change the shard for the primary data. Thus, reindexing and resharding may be performed in response to changes in the data, whether primary or auxiliary. This may be known as atomic shards updates.

In an example embodiment, the formation of the actual Shardlets 610A-C is performed by the index builder 122 in conjunction with the appropriate indexing adapter 112A-112D of FIG. 1. The grouping of the Shardlets 610A-C into ShardGroups 608A-608F and the packing of the ShardGroups 608A-608F into shards may be performed by the index updater 126 in conjunction with the coordinator 108.

In an example embodiment, the assigning of a ShardGroup to a shard is performed dynamically using smart logic. The logic may calculate a weighting score to each potential shard in which the ShardGroup could be stored.

The ShardGroup is then assigned to the shard having the highest weighting score. The entire tenant assignment (e.g., all shards for the tenant) can be reperformed whenever there is a change in data size (e.g., a larger catalog is added) or a reduction in the tenant size (e.g., the tenant changes from a medium-size business to a large business).

In an example, the weighting score for a shard is based on a number of factors. These factors may be any combination of the following:

1. Tenant factors
   - A. Size (how much data a tenant stores)
   - B. Weight (based on number of transactions/frequency of transactions, which may be correlated to entity size)
   - C. Replica number (desired number of copies of ShardGroups across multiple shards for the tenant)
2. Redundancy
3. Weighting scores of other tenants Size is important because there is a desire to have the data distributed evenly among shards. Weight may be assigned by an administrator based on the perceived size of the tenant themselves, such as entity (e.g., company) size. For example, the administrator may assign each tenant a size of small, medium, large, or huge. A huge size may dictate, for example, that the tenant has a shard all for themselves. The replica number is selected to ensure high availability for the data for a tenant.

Redundancy is also a general factor, which is why it is listed separately in the list above. Specifically, while the replica number may be different for each tenant, a separately desired redundancy can also be applied on a per-client application basis. For example, a catalog application may have a different redundancy value than a fulfillment application.

The coordinator 108 may actually be deployed as coordinator nodes in a redundant configuration. Each of these nodes may store configuration information such as topology, core status, and shards. The coordinator nodes may elect one of the nodes as the leader. The leader node has the authoritative information about the nodes containing the configuration. The nodes represent a path for the configuration.

Figure 7:
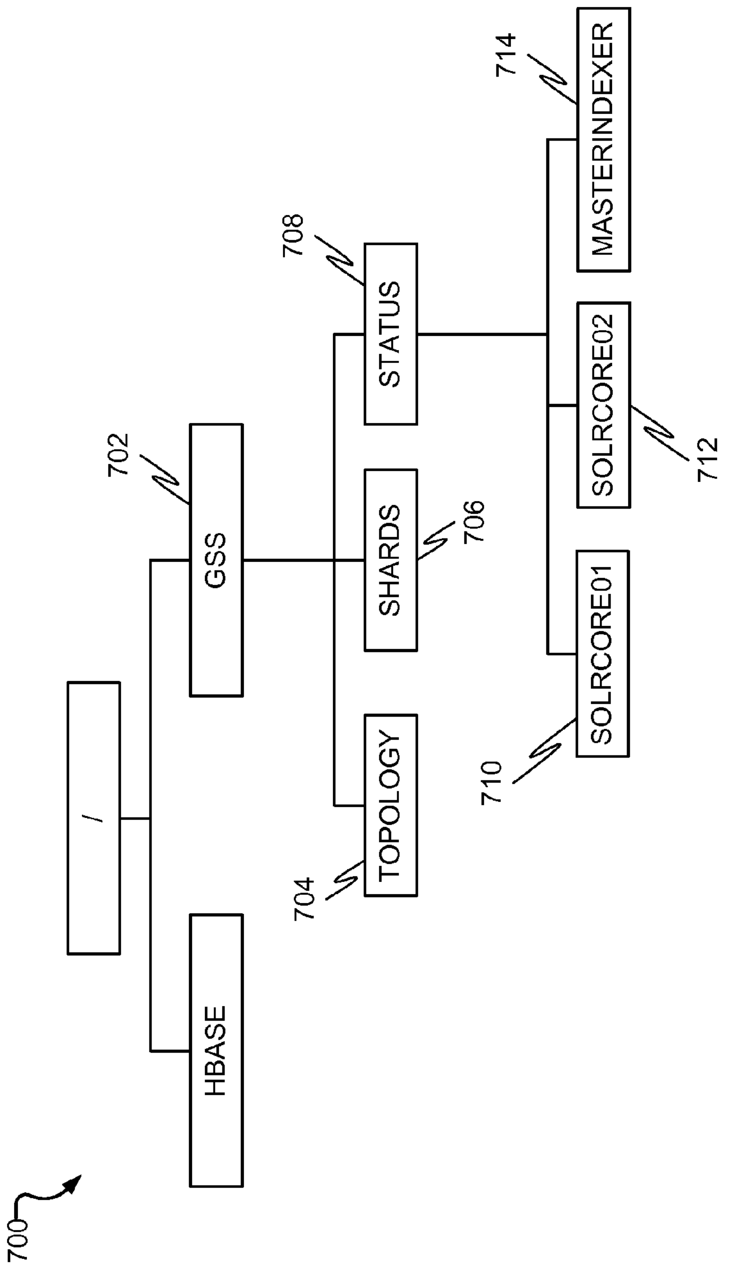
FIG. 7 is a block diagram illustrating a data model for a coordinator in accordance with an example embodiment.

FIG. 7 is a block diagram illustrating a data model 700 for a coordinator (e.g., coordinator 108) in accordance with an example embodiment. A GSS node 702 may include a topology node 704, a shards node 706, and a status node 708. The topology node 704 may store the states topology information based on the deployment. Some nodes from the topology may be down at any given point in time. The following is an example of how the topology can be stored in the topology node 704:

| Node name | Roles | Endpoint Information |
|---|---|---|
| SOLRCore01 | SearchCore | http://pluto:91002/core, QueueName=SOLRCore01 |
| SOLRCore02 | SearchCore | http://pluto:91003/core, QueueName=SOLRCore02 |
| IndexManager | IndexManager | http://mars:91001/core, QueueName=IndexManager |

The shards node 706 may store the current shard configuration based on a deployed partition function. This information may be used by the index builder 122 to build new indices for the next indexing cycle. The index updater 126 may then use this information to pull the correct index from the index builder 122. Based on a replication factor (which may be determined, as described above, based on the replica number for the tenant and/or client application), ShardGroups may be assigned to different shards. The following is an example of tenant information stored by the shards node 706:

| Tenant Name | Replication Factor |
|---|---|
| Tenant_1 | 5 |
| Tenant_2 | 3 |
| Tenant_3 | 2 |

Additional shard information may be stored by the shards node 706 as follows:

| Shard Name | Tenant Vector |
|---|---|
| Shard1 | Tenant_1, Tenant_2, Tenant_4 |
| Shard2 | Tenant_1, Tenant_3, Tenant_4 |

The status node 708 may be used by all nodes of the GSS node 702 to advertise their presence to others. Nodes 710, 712, and 714 may be ephemeral nodes, meaning they live and die with the parent node.

Figure 8:
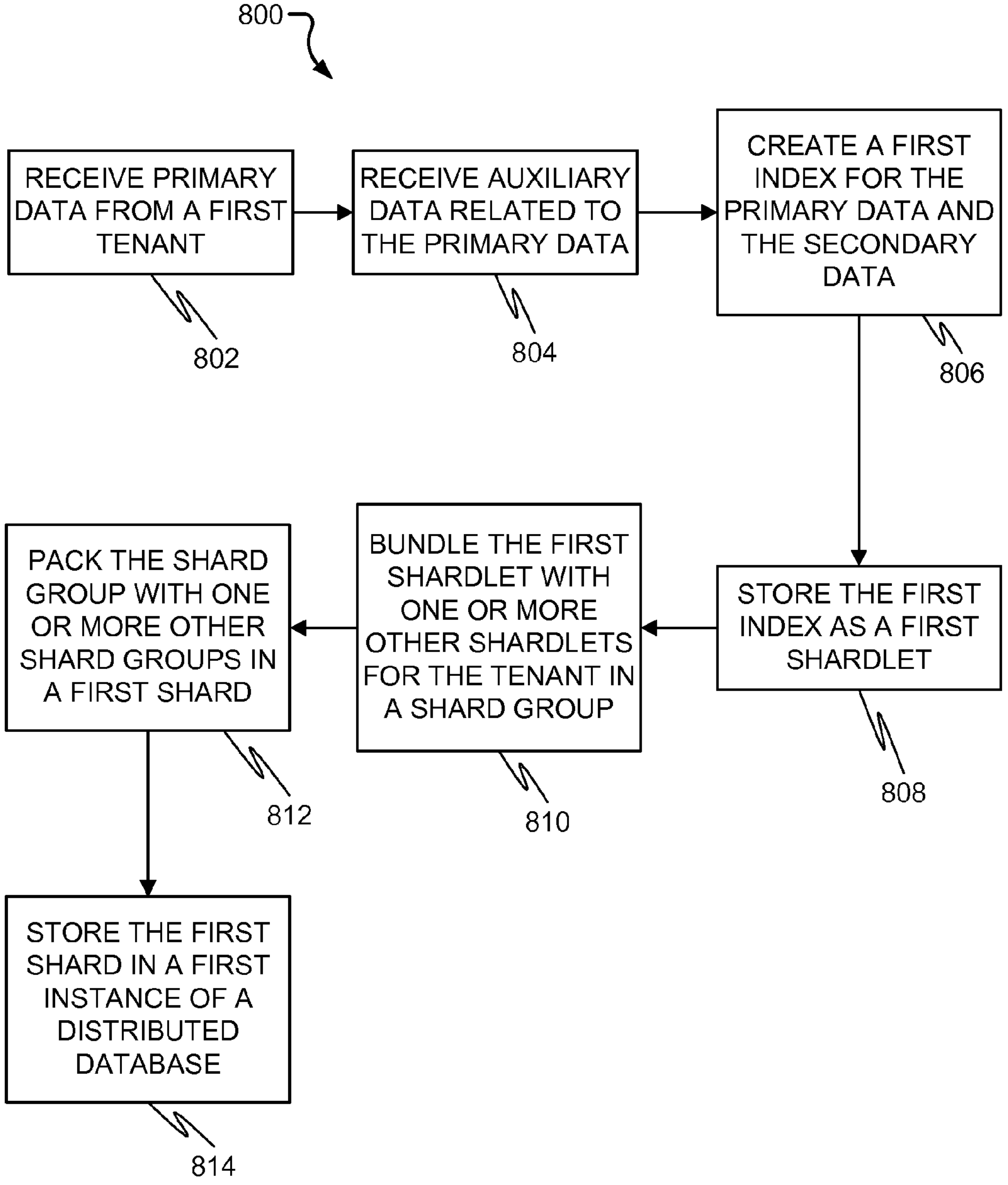
FIG. 8 is a flow diagram illustrating a method, in accordance with an example embodiment, of elastic sharding.

FIG. 8 is a flow diagram illustrating a method 800, in accordance with an example embodiment, of elastic sharding. At operation 802, primary data is received from a first tenant in a computer network. At operation 804, auxiliary data relating to the primary data is received from the first tenant. At operation 806, a first index is created for the primary data and the auxiliary data from the first tenant. At operation 808, the first index is stored as a first shardlet. At operation 810, the first shardlet is bundled with one or more other shardlets for the tenant in a shard group. At operation 812, the shard group is packed with one or more other shard groups in a first shard. This packing may be performed dynamically in response to one or more updates to the primary or auxiliary data. The packing may be performed dynamically based on weighting scores assigned to each of one or more shards. At operation 814, the first shard is stored in a first instance of a distributed database, the distributed database comprising a plurality of instances, each instance operating on a different logical or physical device.

In an example embodiment, a smart recovery strategy is provided to enable continuation of the system following a natural or human-indexed disaster. In this example embodiment, a request is received for indexing data. The data can then be pulled and copied into an distributed database (in a reading phase). The file is then broken into rows for each item and put into different tables in HBase (in a parsing phase). Each row then goes through indexing logic and an intermediate form of indexes known as a shardlet is produced on the HDFS (in an indexing phase). The indexes (known as shards) are then created on specified set of nodes' local disk (activating phase).

In order to minimize the data being transferred across data centers, the system replicates the desired data in HBase so that the search index creation can be started from the parsing phase on the disaster recovery data center (this may be known as re-sharding with indexing). Re-sharding with indexing can occur on the disaster recovery data center based on a predefined schedule.

Figure 9:
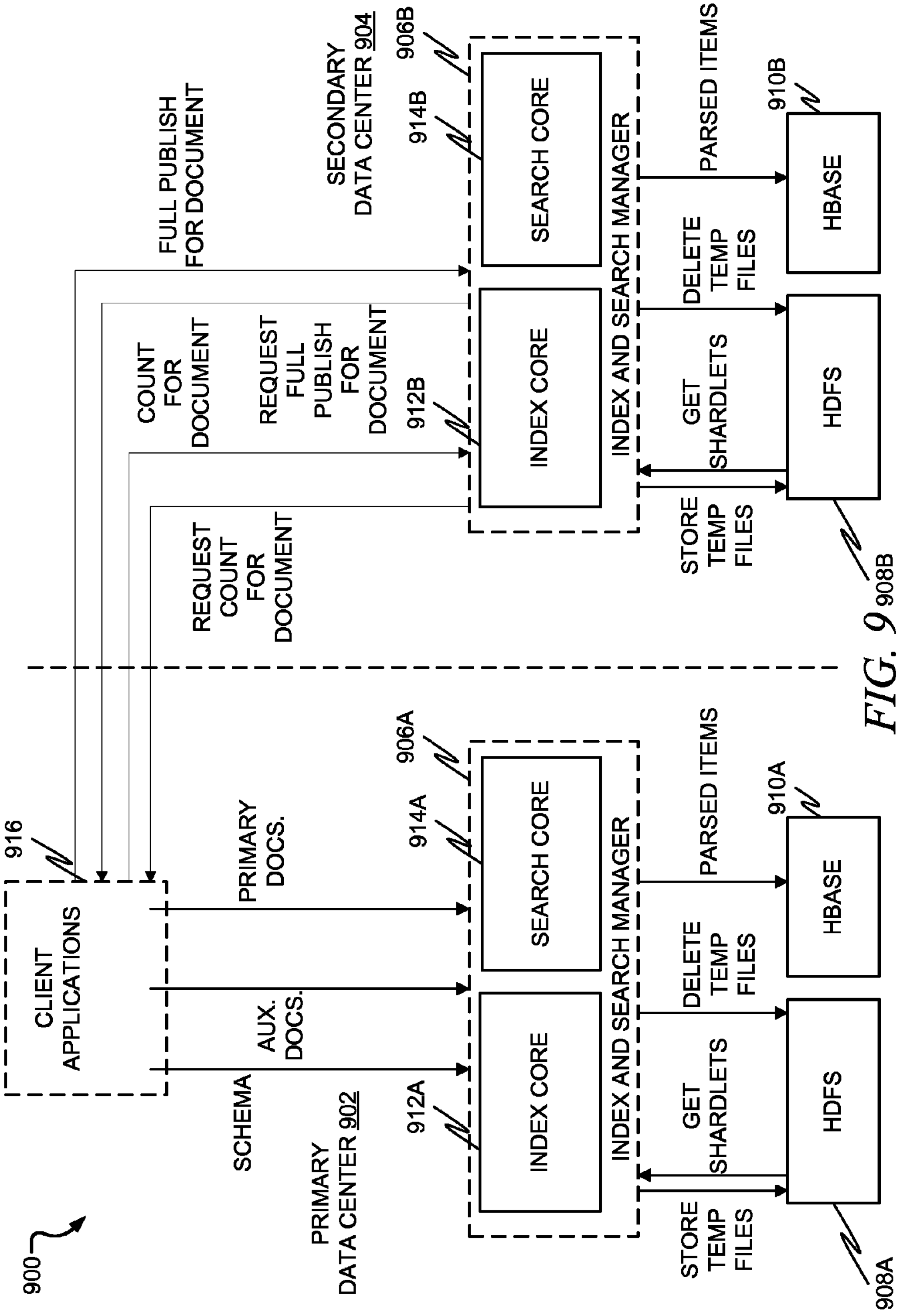
FIG. 9 is a block diagram illustrating a system, in accordance with an example embodiment, for delta replication of index fragments.

FIG. 9 is a block diagram illustrating a system 900, in accordance with an example embodiment, for delta replication of index fragments. The system 900 includes a primary data center 902 and a secondary data center 904. The secondary data center 904 replicates at least some of the functioning and database of the primary data center 902. Specifically, a copy of the index and search manager 906A is stored in the secondary data center 904 (shown as index and search manager 906B). Likewise, the system 900 may periodically (e.g., once a day) copy the latest versions of the HDFS 908A and HBase 910A into the secondary data center 904 (shown as HDFS 908B and HBase 910B, respectively).

As described earlier, the index and search manager 906A, 906B is made up of an index core 912A, 912B and a search core 914A, 914B. The index core 912A, 912B obtains a schema, auxiliary documents, and one or more primary documents (e.g., a catalog) from one or more client applications 916 when a publish command is issued. The publish command may be a full publish, in which a full primary document (such as a catalog containing many items) is published, or a partial publish, in which only a portion of a primary document (such as only new items in a catalog) are published.

The index core 912A, 912B then reads these documents, parses the documents (into, e.g., Java), and indexes them. The parsing of the documents involves storing parsed data in HBase 910A, 910B. The indexing of documents, and particularly the primary documents (e.g., catalog) involves creating temporary files on the HDFS 908A, 908B and then creating one or more shardlets on the HDFS 908A, 908B. Each primary document is a shardlet and many shardlets become one shard. Many shards then are uploaded from the HDFS 908A 908B into the index and search manager 906A, 906B as a search core 914A, 914B.

In an example embodiment, when a disaster occurs that renders the primary data center 902 inoperable or unreachable, the system 900 may switch directly to the secondary data center 904, such that the client applications 916 interact with index and search manager 906B instead of index and search manager 906A. While the HDFS 908B and HBase 910B may be kept somewhat up to date (e.g., replication occurring once a day), there is still a lag where items may have been indexed by the primary data center 902 but are not yet stored in the secondary data center 904 (e.g., everything that has been indexed today). The result is that when a disaster occurs, users may be searching old data inadvertently.

In an example embodiment, in order to reduce the possibility of users searching on old data, a delta replication method is utilized to ensure that the indexed data in the search core 914B and HDFS 908B is as up-to-date as possible. Specifically, when it is determined that a disaster occurs, the index and search manager 906B on the secondary data center 904 issues a query to every tenant requesting document identifications and item counts. It then compares the item count for each of the documents to a document count actually stored on the secondary data center 904 (i.e., reflective of the last periodic update from the primary data center 902). For any document where the counts do not match, the index and search manager 906B requests a full publish for the document from the client application(s) 916.

Figure 10:
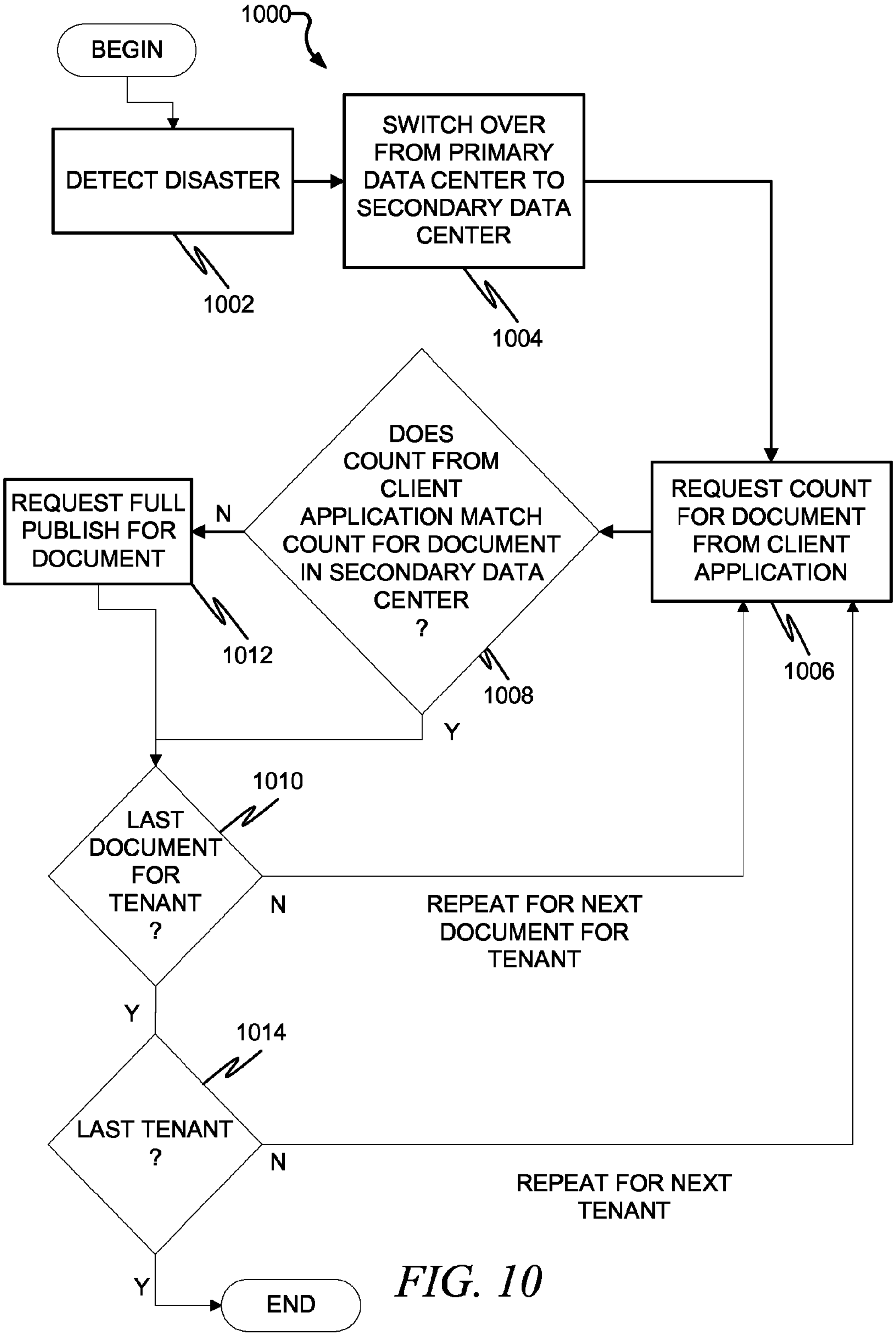
FIG. 10 is a flow diagram illustrating a method, in accordance with an example embodiment, for delta replication of index fragments.

FIG. 10 is a flow diagram illustrating a method 1000, in accordance with an example embodiment, for delta replication of index fragments. At operation 1002, a disaster is detected. This disaster is one that renders, for example, a primary data center inoperable or unreachable by a client application. At operation 1004, in response to the disaster detection, the system switches over from a primary data center to a secondary data center. This may include, for example, routing all requests from the client application to the secondary data center (or informing the client application that future requests should be sent to the secondary data center). A loop through all tenants is then started. For each tenant, a loop through all documents for the tenant stored in the search core on the secondary data center is started. At operation 1006, a count for the document is requested from a client application. At operation 1008, the count for the document from the client application is compared to a count for the document on the search core of the secondary data center. This count may be an indication of how many items are stored for the document. For example, if the document is a catalog, the count may indicate how many items are in the catalog. The comparison at operation 1008 is to determine whether the counts match. If so, then the process may proceed to the next document, if there is one, by advancing to operation 1010, where it is determined if there are any more documents for the tenant. If the counts do not match, however, then at operation 1012 a full publish for the document is requested from the client application. Then the process may proceed to operation 1010. If, at operation 1010, it is determined that there are more documents for the tenant, then the process may loop back to operation 1006 for the next document for the tenant. If, at operation 1010, it is determined that there are no more documents for the tenant, then at operation 1014, it is determined if there are any more tenants. If so, then the process may loop back to operation 1006 for the first document for the next tenant. If not, then the process may end.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-10 are implemented in some embodiments in the context of a machine and an associated software architecture 1102. The sections below describe representative software architecture(s) 1102 and machine (e.g., hardware) architecture that are suitable for use with the disclosed embodiments.

Software architectures 1102 are used in conjunction with hardware architectures to create devices and machines tailored to particular purposes. For example, a particular hardware architecture coupled with a particular software architecture 1102 will create a mobile device, such as a mobile phone, tablet device, or so forth. A slightly different hardware and software architecture 1102 may yield a smart device for use in the "internet of things" while yet another combination produces a server computer for use within a cloud computing architecture. Not all combinations of such software and hardware architectures are presented here as those of skill in the art can readily understand how to implement the subject matter of the disclosure in different contexts from the disclosure contained herein.

Software Architecture

Figure 11:
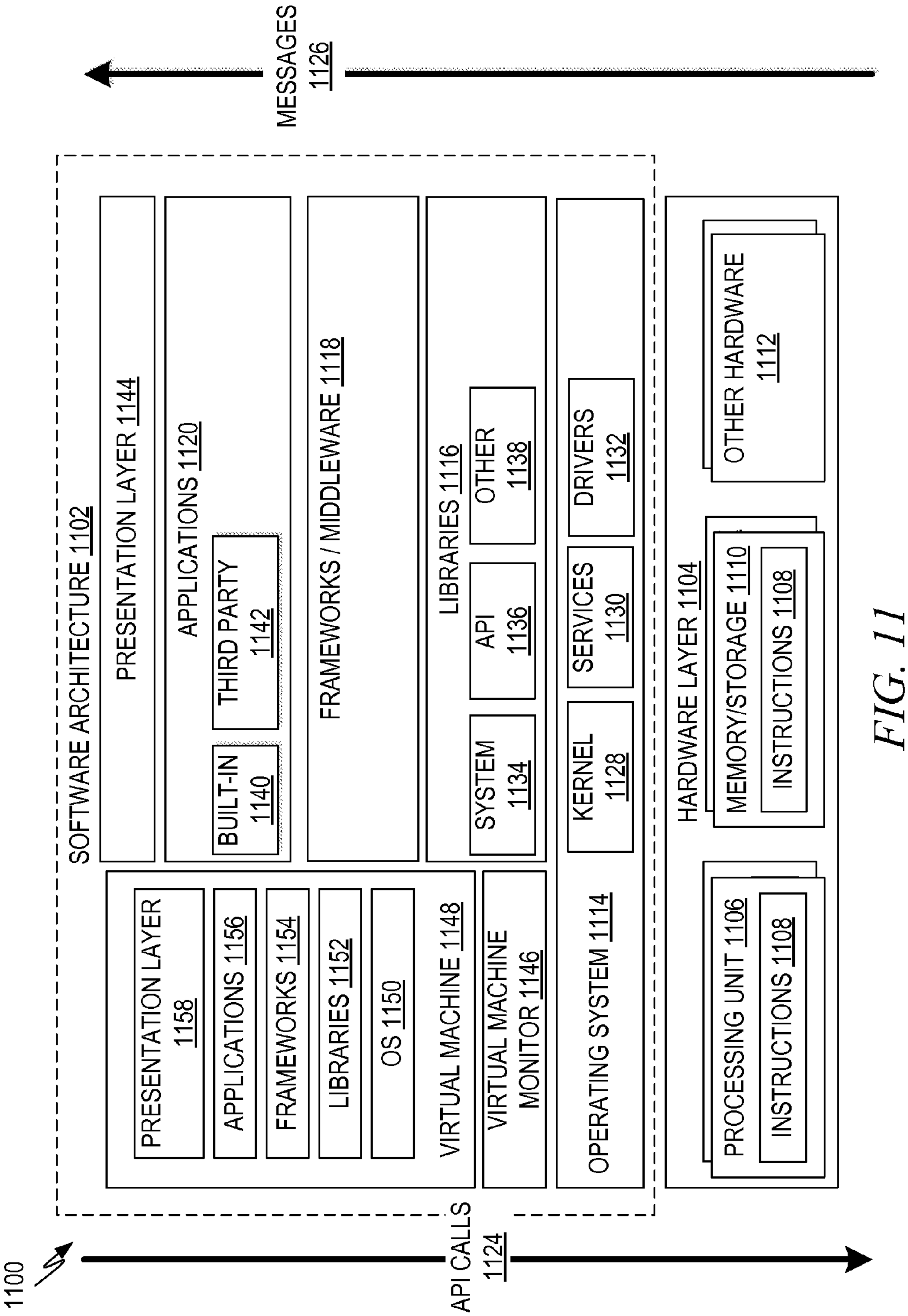
FIG. 11 is a block diagram illustrating a representative software architecture, which may be used in conjunction with various hardware architectures herein described.

FIG. 11 is a block diagram 1100 illustrating a representative software architecture 1102, which may be used in conjunction with various hardware architectures herein described. FIG. 11 is merely a non-limiting example of a software architecture 1102 and it will be appreciated that many other architectures may be implemented to facilitate the functionality described herein. The software architecture 1102 may be executing on hardware such as machine 1200 of FIG. 12 that includes, among other things, processors 1210, memory/storage 1230, and I/O components 1250. A representative hardware layer 1104 is illustrated and can represent, for example, the machine 1200 of FIG. 12. The representative hardware layer 1104 comprises one or more processing units 1106 having associated executable instructions 1108. Executable instructions 1108 represent the executable instructions of the software architecture 1102, including implementation of the methods, modules and so forth of FIGS. 1-10. Hardware layer 1104 also includes memory and/or storage modules 1110, which also have executable instructions 1108. Hardware layer 1104 may also comprise other hardware 1112, which represents any other hardware of the hardware layer 1104, such as the other hardware illustrated as part of machine 1200.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120 and presentation layer 1144. Operationally, the applications 1120 and/or other components within the layers may invoke application programming interface (API) calls 1124 through the software stack and receive a response, returned values, and so forth illustrated as messages 1126 in response to the API calls 1124. The layers illustrated are representative in nature and not all software architectures 1102 have all layers. For example, some mobile or special purpose operating systems 1114 may not provide a frameworks/middleware 1118, while others may provide such a layer. Other software architectures 1102 may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than interfacing directly with the underlying operating system 1114 functionality (e.g., kernel 1128, services 1130 and/or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., Database Shared Library (DBSL) that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks/middleware 1118 (also sometimes referred to as middleware) may provide a higher-level common infrastructure that may be utilized by the applications 1120 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1120 and/or other software components/modules, some of which may be specific to a particular operating system 1114 or platform.

The applications 1120 include built-in applications 1140 and/or third-party applications 1142. Examples of representative built-in applications 1140 may include, but are not limited to, a contacts application, a browser application, a book reader application, a location application, a media application, a messaging application, and/or a game application. Third party applications 1142 may include any of the built in applications 1140 as well as a broad assortment of other applications 1120. In a specific example, the third-party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1142 may invoke the API calls 1124 provided by the mobile operating system such as operating system 1114 to facilitate functionality described herein.

The applications 1120 may utilize built-in operating system 1114 functions (e.g., kernel 1128, services 1130 and/or drivers 1132), libraries 1116 (e.g., system libraries 1134, API libraries 1136, and other libraries 1138), and frameworks/middleware 1118 to create user interfaces to interact with users of the system. Alternatively, or additionally, in some systems, interactions with a user may occur through a presentation layer, such as presentation layer 1144. In these systems, the application/module "logic" can be separated from the aspects of the application/module that interact with a user.

Some software architectures 1102 utilize virtual machines. In the example of FIG. 11, this is illustrated by virtual machine 1148. A virtual machine creates a software environment where applications/modules can execute as if they were executing on a hardware machine (such as the machine 1200 of FIG. 12, for example). A virtual machine is hosted by a host operating system (operating system 1114 in FIG. 11) and typically, although not always, has a virtual machine monitor 1146, which manages the operation of the virtual machine 1148 as well as the interface with the host operating system (i.e., operating system 1114). A software architecture 1102 executes within the virtual machine 1148 such as an operating system 1150, libraries 1152, frameworks/middleware 1154, applications 1156 and/or presentation layer 1158. These layers of software architecture 1102 executing within the virtual machine 1148 can be the same as corresponding layers previously described or may be different.

Example Machine Architecture and Machine-Readable Medium

Figure 12:
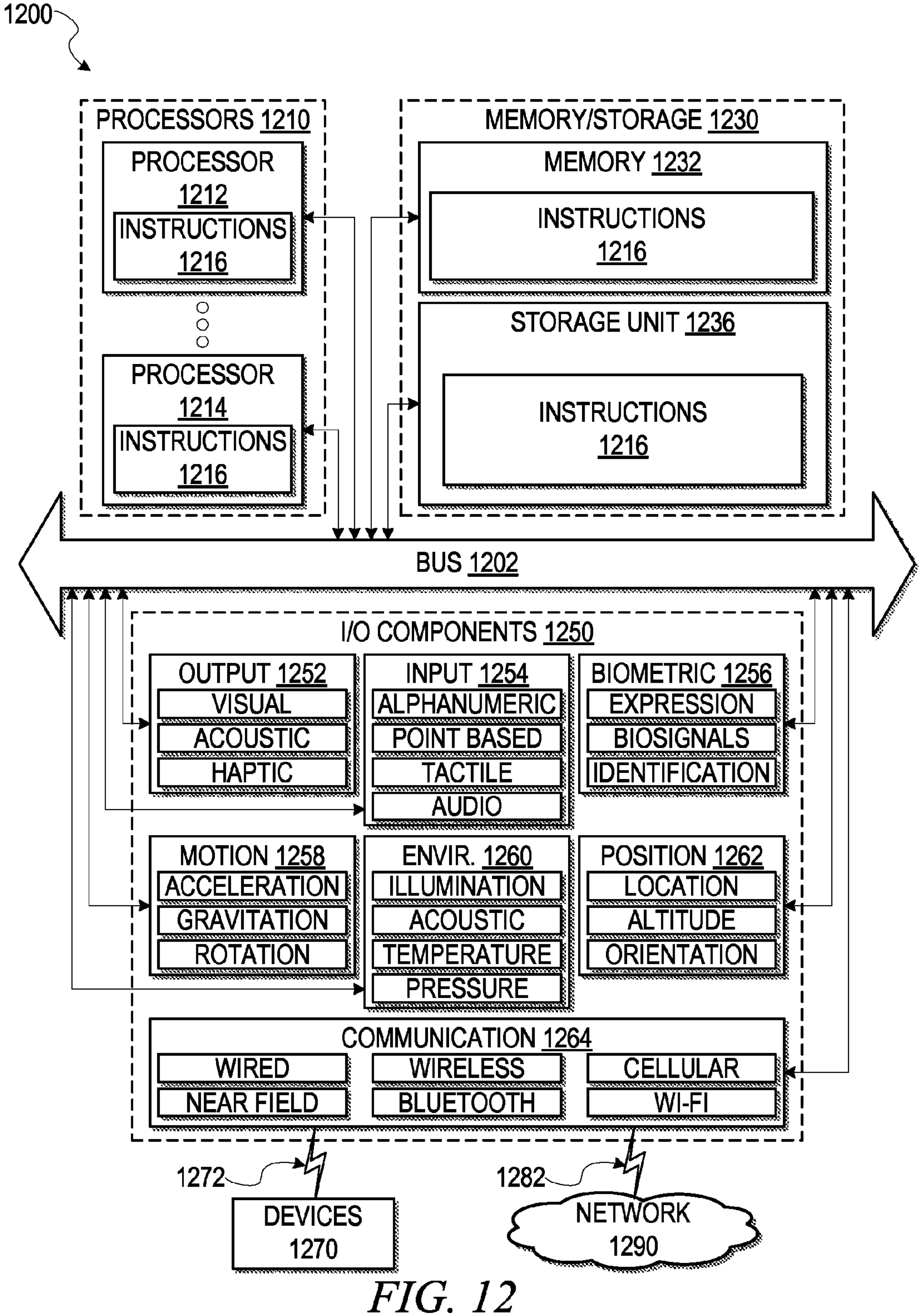
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. For example, the instructions 1216 may cause the machine 1200 to execute the flow diagrams of FIGS. 5 and 8. Additionally, or alternatively, the instructions 1216 may implement the various modules described in the disclosure, and so forth. The instructions 1216 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory/storage 1230, and I/O components 1250, which may be configured to communicate with each other such as via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 1212 and processor 1214 that may execute instructions 1216. The term "processor" is intended to include a multi-core processor 1210 that may comprise two or more independent processors 1210 (sometimes referred to as "cores") that may execute instructions 1216 contemporaneously. Although FIG. 12 shows multiple processors 1212, 1214, the machine 1200 may include a single processor 1210 with a single core, a single processor 1210 with multiple cores (e.g., a multi-core processor), multiple processors 1210 with a single core, multiple processors 1210 with multiples cores, or any combination thereof.

The memory/storage 1230 may include a memory 1232, such as a main memory, or other memory storage, and a storage unit 1236, both accessible to the processors 1210 such as via the bus 1202. The storage unit 1236 and memory 1232 store the instructions 1216 embodying any one or more of the methodologies or functions described herein. The instructions 1216 may also reside, completely or partially, within the memory 1232, within the storage unit 1236, within at least one of the processors 1210 (e.g., within the processor 1210's cache memory), or any suitable combination thereof, during execution thereof by the machine 1200. Accordingly, the memory 1232, the storage unit 1236, and the memory of processors 1210 are examples of machine-readable media.

As used herein, "machine-readable medium" means a device able to store instructions 1216 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 1216. The term "machine-readable medium" shall also be taken to include any medium, or combination of multiple media, that is capable of storing instructions (e.g., instructions 1216) for execution by a machine (e.g., machine 1200), such that the instructions 1216, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1250 may include a wide variety of components to receive input, provide output, produce output, transmit information, exchange information, capture measurements, and so on. The specific I/O components 1250 that are included in a particular machine 1200 will depend on the type of machine 1200. For example, portable machines 1200 such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262 among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1262 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1290 or devices 1270 via coupling 1282 and coupling 1272 respectively. For example, the communication components 1264 may include a network interface component or other suitable device to interface with the network 1290. In further examples, communication components 1264 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1270 may be another machine 1200 or any of a wide variety of peripheral devices (e.g., a peripheral device coupled via a Universal Serial Bus (USB)).

Moreover, the communication components 1264 may detect identifiers or include components operable to detect identifiers. For example, the communication components 1264 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1290 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1290 or a portion of the network 1290 may include a wireless or cellular network and the coupling 1282 may be a Code Division Multiple Access (CDMA) connection, a Global System for Mobile communications (GSM) connection, or other type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1216 may be transmitted or received over the network 1290 using a transmission medium via a network interface device (e.g., a network interface component included in the communication components 1264) and utilizing any one of a number of well-known transfer protocols (e.g., hypertext transfer protocol (HTTP)). Similarly, the instructions 1216 may be transmitted or received using a transmission medium via the coupling 1272 (e.g., a peer-to-peer coupling) to devices 1270. The term "transmission medium" shall be taken to include any intangible medium that is capable of storing, encoding, or carrying instructions 1216 for execution by the machine 1200, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:

detecting a disaster at a primary data center, the primary data center comprising an indexing and search manager comprising an index core and a search core, a distributed file system, and a distributed storage system, the distributed file system and distributed storage system utilized in indexing of documents to be made available for search via the search core;

in response to the detecting of the disaster, switching over from the primary data center to a secondary data center such that searches from one or more client applications are routed to the secondary data center, the secondary data center comprising an indexing and search manager comprising an index core and a search core, a distributed file system, and a distributed storage system, the search core and distributed file system updated periodically via duplication of the search core and distributed file system from the primary data center;

for each document stored in the search core of the secondary data center:

requesting a count for the document from a first client application;

determining whether the count for the document from the first client application matches a count for the document from the search core of the secondary data center; and in response to a determination that the count for the document from the first client application does not match a count for the document from the search core of the secondary data center, requesting a full publish for the document from the first client application;

wherein the method further comprises performing the requesting the count, the determining, and the requesting of the full publish for each document for each tenant represented in the search core of the secondary data center.

2. The method of claim 1, wherein the indexing of documents comprises:

receiving primary data from a first tenant in a computer network;

receiving auxiliary data relating to the primary data from the first tenant;

creating a first index for the primary data and the auxiliary data from the first tenant; and storing the first index in a first shard.

3. The method of claim 2, wherein the first shard comprises a plurality of shardlets, each shardlet corresponding to a piece of the primary data.

4. The method of claim 1, wherein each document is a catalog of items and the count for a document is a count of a number of items in the corresponding catalog.

5. The method of claim 1, further comprising organizing the first shard with a plurality of additional shards into the search core of the primary data center.

6. The method of claim 1, wherein the distributed storage system of the primary data center stores parsed data utilized during the indexing.

7. A system comprising:

a secondary data center comprising:

one or more processors;

a search and indexing manager comprising:

an index core; and a search core;

a distributed file system; and a distributed storage system;

the search and indexing manager of the secondary data center configured to:

detect a disaster at a primary data center and, in response to the detecting, for each document stored in the search core of the secondary data center:

request a count for the document from a first client application;

determine whether the count for the document from the first client application matches a count for the document from the search core of the secondary data center; and in response to a determination that the count for the document from the first client application does not match a count for the document from the search core of the secondary data center, request a full publish for the document from the first client application, wherein the requesting the count, the determining, and the requesting of the full publish are performed for each document for each tenant represented in the search core of the secondary data center.

8. The system of claim 7, wherein an index core of the primary data center and the index core of the secondary data center are configured to perform the following operations:

receiving primary data from a first tenant in a computer network;

receiving auxiliary data relating to the primary data from the first tenant;

creating a first index for the primary data and the auxiliary data from the first tenant; and storing the first index in a first shard.

9. The system of claim 8, wherein the first shard comprises a plurality of shardlets, each shardlet corresponding to a piece of the primary data.

10. The system of claim 7, wherein each document is a catalog of items and the count for a document is a count of a number of items in the corresponding catalog.

11. The system of claim 7, wherein the index core of the primary data center and the index core of the secondary data center are further configured to organize the first shard with a plurality of additional shards into the search core of the primary data center.

12. A non-transitory machine-readable storage medium comprising instructions, which when implemented by one or more machines, cause the one or more machines to perform operations comprising:

detecting a disaster at a primary data center, the primary data center comprising an indexing and search manager comprising an index core and a search core, a distributed file system, and a distributed storage system, the distributed file system and distributed storage system utilized in indexing of documents to be made available for search via the search core;

in response to the detecting of the disaster, switching over from the primary data center to a secondary data center such that searches from one or more client applications are routed to the secondary data center, the secondary data center comprising an indexing and search manager comprising an index core and a search core, a distributed file system, and a distributed storage system, the search core and distributed file system updated periodically via duplication of the search core and distributed file system from the primary data center;

for each document stored in the search core of the secondary data center:

requesting a count for the document from a first client application;

determining whether the count for the document from the first client application matches a count for the document from the search core of the secondary data center; and in response to a determination that the count for the document from the first client application does not match a count for the document from the search core of the secondary data center, requesting a full publish for the document from the first client application;

wherein the instructions further comprise performing the requesting the count, the determining, and the requesting of the full publish for each document for each tenant represented in the search core of the secondary data center.

13. The non-transitory machine-readable storage medium of claim 12, wherein the indexing of documents comprises:

receiving primary data from a first tenant in a computer network;

receiving auxiliary data relating to the primary data from the first tenant;

creating a first index for the primary data and the auxiliary data from the first tenant; and storing the first index in a first shard.

14. The non-transitory machine-readable storage medium of claim 13, wherein the first shard comprises a plurality of shardlets, each shardlet corresponding to a piece of the primary data.

15. The non-transitory machine-readable storage medium of claim 12, wherein each document is a catalog of items and the count for a document is a count of a number of items in the corresponding catalog.

16. The non-transitory machine-readable storage medium of claim 12, further comprising organizing the first shard with a plurality of additional shards into the search core of the primary data center.

17. The non-transitory machine-readable storage medium of claim 12, wherein the distributed storage system of the primary data center stores parsed data utilized during the indexing.

* * * * *